United States Patent
Kanna et al.

(10) Patent No.: US 11,891,577 B2
(45) Date of Patent: Feb. 6, 2024

(54) FCC ADDITIVE COMPOSITION FOR BOTTOMS CRACKING AND A PROCESS FOR PREPARATION THEREOF

(71) Applicant: HINDUSTAN PETROLEUM CORPORATION LIMITED, Maharashtra (IN)

(72) Inventors: Narasimharao Kanna, Bangalore (IN); Somanath Kukade, Bangalore (IN); Pramod Kumar, Bangalore (IN); Ramachandrarao Bojja, Bangalore (IN)

(73) Assignee: HINDUSTAN PETROLEUM CORPORATION LIMITED, Mumbai (IN)

( * ) Notice: Subject to any disclaimer, the term of this patent is extended or adjusted under 35 U.S.C. 154(b) by 145 days.

(21) Appl. No.: 17/265,182

(22) PCT Filed: May 20, 2020

(86) PCT No.: PCT/IB2020/054766
§ 371 (c)(1),
(2) Date: Feb. 1, 2021

(87) PCT Pub. No.: WO2021/161081
PCT Pub. Date: Aug. 19, 2021

(65) Prior Publication Data
US 2022/0112431 A1    Apr. 14, 2022

(30) Foreign Application Priority Data
Feb. 10, 2020   (IN) ............................. 202021005741

(51) Int. Cl.
| | |
|---|---|
| *C10G 11/04* | (2006.01) |
| *B01J 21/04* | (2006.01) |
| *B01J 21/16* | (2006.01) |
| *B01J 27/16* | (2006.01) |
| *B01J 35/00* | (2006.01) |
| *B01J 35/10* | (2006.01) |
| *B01J 37/00* | (2006.01) |
| *B01J 37/04* | (2006.01) |
| *C10G 11/18* | (2006.01) |

(52) U.S. Cl.
CPC .............. *C10G 11/04* (2013.01); *B01J 21/04* (2013.01); *B01J 21/16* (2013.01); *B01J 27/16* (2013.01); *B01J 35/0006* (2013.01); *B01J 35/1019* (2013.01); *B01J 35/1038* (2013.01); *B01J 35/1042* (2013.01); *B01J 35/1061* (2013.01); *B01J 37/009* (2013.01); *B01J 37/0045* (2013.01); *B01J 37/04* (2013.01); *C10G 11/18* (2013.01)

(58) Field of Classification Search
CPC ......... C01G 11/04; C01G 11/18; B01J 21/04; B01J 21/16; B01J 27/16; B01J 35/0006; B01J 35/1019; B01J 35/1038; B01J 35/1042; B01J 35/1061; B01J 37/0045; B01J 37/009; B01J 37/04
See application file for complete search history.

(56) References Cited

U.S. PATENT DOCUMENTS

| | | | | |
|---|---|---|---|---|
| 5,190,902 | A * | 3/1993 | Demmel ................ | B01J 29/084 502/61 |
| 6,114,267 | A * | 9/2000 | Ghosh .................... | B01J 29/084 502/64 |
| 6,551,572 | B2 | 4/2003 | Macedo | |
| 6,613,710 | B2 * | 9/2003 | Ray ...................... | B01J 37/0045 502/64 |
| 2007/0060780 | A1 * | 3/2007 | Stamires ................. | B01J 29/40 502/64 |
| 2012/0037540 | A1 | 2/2012 | Jansen | |
| 2013/0115164 | A1 | 5/2013 | Fu | |
| 2015/0174560 | A1 | 6/2015 | Mcquire | |
| 2015/0175900 | A1 | 6/2015 | Smith | |
| 2016/0216242 | A1 * | 7/2016 | Ravichandran ........ | C10G 11/05 |
| 2018/0361367 | A1 * | 12/2018 | Ludvig ................... | B01J 21/16 |

FOREIGN PATENT DOCUMENTS

| | | |
|---|---|---|
| EP | 2990463 A1 | 3/2016 |
| EP | 2998020 B1 | 11/2017 |

OTHER PUBLICATIONS

Ugochukwu et al. "Effect of acid activated clay minerals on biodegradation of crude oil hydrocarbons", Nov. 15, 2013. International Biodeterioration & Biodegradation, p. 185-191. (Year: 2013).*
Belver et al. "Chemical Activation of a Kaolinite under Acid and Alkaline Conditions", Jan. 9, 2002. Chem. Mater. vol. 14 p. 2033-2043. (Year: 2002).*
Indian FER dated Nov. 1, 2021 as received in application No. 202021005741.

* cited by examiner

*Primary Examiner* — Melissa S Swain
*Assistant Examiner* — Catriona M Corallo
(74) *Attorney, Agent, or Firm* — Maschoff Brennan

(57) ABSTRACT

The present disclosure is an FCC additive composition comprising an acidity enhanced modified clay; an acidity enhanced modified alumina; a binder; a phosphorous oxide and a boron oxide, as well as a process for preparing the FCC additive composition. The FCC additive as disclosed is capable of cracking bottoms comprising large hydrocarbon molecules/heavy fuel oils, it enhances bottoms conversion and reduces formation of dry gas.

15 Claims, No Drawings

FCC ADDITIVE COMPOSITION FOR BOTTOMS CRACKING AND A PROCESS FOR PREPARATION THEREOF

FIELD

The present disclosure relates to a Fluid Catalytic Cracking (FCC) additive composition and a process for preparation thereof. Particularly, the present disclosure relates to an FCC additive composition for bottoms cracking and a process for preparation thereof.

Definitions

As used in the present disclosure, the following term is generally intended to have the meaning as set forth below, except to the extent that the context in which it is used to indicate otherwise.

Equilibrium catalyst (E-CAT): Equilibrium catalyst is a partially deactivated Fluidized Catalytic Cracking Catalyst which has spent an equilibration time in the FCC reactor and represents a catalyst having particles of average age and activity. The equilibrium catalyst (E-CAT) composition depends on the fresh catalyst, catalyst make up and additive composition and typically contains silica, alumina, phosphorus pentoxide, rare earth oxide and metals originating from the feed such as Nickel, Vanadium, Iron, Sodium, Calcium and the like. E-cat is an equilibrium catalyst used in an FCC reactor, which is simulated in the lab to match the actual plant FCC catalyst composition.

BACKGROUND

The background information herein below relates to the present disclosure but is not necessarily prior art.

Fluid Catalytic Cracking (FCC) units are playing an increasingly important role for converting heavy hydrocarbons to light hydrocarbons. In the FCC unit, heavy hydrocarbons are subjected to cracking in the presence of an FCC catalyst such as E-CAT to obtain light hydrocarbons. Cracking heavy fuel oil/heavy hydrocarbons (bottoms or slurry) from an FCC unit is a challenge that refiners have been facing since many years. Typically, components in the FCC feed having boiling points above 800° F. (the heavy fuel oil) cannot be cracked by conventional FCC additives containing zeolite component alone.

Heavy fuel oil in bottoms have both normal paraffins ($C_{14}$-$C_{34}$) having a molecular size in the range of 12 to 20 Å and heavy aromatic molecules ($C_{14}$-$C_{60}$) having a molecular size in the range of 12 to 25 Å, however, the zeolite present in FCC additives has a pore size below 7.5 Å. Therefore, the hydrocarbons present in the heavy fuel oil are too large to fit into the zeolite pores for cracking. Due to this, large hydrocarbon molecules are first cracked on the surface of the FCC catalyst matrix to produce smaller hydrocarbons, which are then cracked inside the zeolite pores. The overall process leads to over-cracking of hydrocarbons, resulting in the formation of coke and dry gases.

There is, therefore, felt a need for an FCC additive composition that mitigates the drawbacks mentioned hereinabove.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide an FCC additive composition.

Another object of the present disclosure is to provide an FCC additive composition, which is capable of cracking bottoms containing heavy fuel oil.

Yet another object of the present disclosure is to provide an FCC additive composition, which is capable of reducing the formation of dry gas in the FCC process.

Still another object of the present disclosure is to provide a process for the preparation of the FCC additive composition.

Other objects and advantages of the present disclosure will be more apparent from the following description, which is not intended to limit the scope of the present disclosure.

SUMMARY

The present disclosure relates to an FCC additive composition for bottoms cracking. The FCC additive composition comprises an acidity enhanced modified clay in an amount in the range of 10 to 30 wt %; an acidity enhanced modified alumina in an amount in the range of 50 to 70 wt %; a binder in an amount in the range of 1 to 30 wt %; a phosphorus oxide in an amount in the range of 5 to 15 wt %; and a boron oxide in an amount in the range of 1 to 10 wt %. The acidity enhanced modified clay has an acidity in the range of 210 to 250 micromole/gm; and the acidity enhanced modified alumina has an acidity in the range of 370 to 400 micromole/gm.

The FCC additive composition is characterized by having a total surface area in the range of 130 to 150 m$^2$/g, an external surface area in the range of 120 to 140 m$^2$/g, a micro surface area in the range of 10 to 30 m$^2$/g, a pore volume in the range of 0.1 to 1.0 cc and a pore size in the range of 110 to 130 Å.

The present disclosure further provides a process for preparing an FCC additive composition. Initially, at least one alumina and an aqueous solution of a precursor of phosphorus are mixed in water under stirring for a time period in the range of 0.5 to 5 hours, at a temperature in the range of 25 to 35° C. to obtain a first slurry comprising a modified alumina. At least one binder is added to a first slurry comprising modified alumina under stirring for a time period in the range of 20 to 60 minutes, at a temperature in the range of 25 to 35° C. to obtain a second slurry. A precursor of boron is then added to the second slurry under stirring for a time period in the range of 0.5 to 2 hours, at a temperature in the range of 25 to 35° C. to obtain a resultant slurry comprising acidity enhanced modified alumina. An acidity enhanced modified clay is added to the resultant slurry under stirring for a time period in the range of 0.5 to 5 hours, at a temperature in the range of 25 to 35° C. to obtain a product mixture comprising the FCC additive composition. The FCC additive composition is separated from the product mixture, followed by drying and calcining to obtain the FCC additive composition.

The acidity enhanced modified clay is prepared by treating a clay with an aqueous solution of a mineral acid having concentration in the range of 0.5 to 5 moles, under stirring at a temperature in the range of 70 to 100° C. for a time period in the range of 40 to 80 minutes to obtain a mixture. The mixture is cooled to a temperature in the range of 20 to 30° C., followed by filtration to obtain a residue. The residue is washed with water until acid free to obtain a mesoporous clay. Water is added to the mesoporous clay along with an aqueous solution of a precursor of phosphorus to obtain a slurry. The slurry is heated at a temperature in the range of 40 to 70° C. for a time period in the range of 0.5 to 5 hours to obtain the acidity enhanced modified clay. Typically, the clay is calcined at a temperature in the range of 700 to 900° C. for a time period in the range of 5 to 15 hours prior to treating it with the mineral acid.

DETAILED DESCRIPTION

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

FCC bottoms comprising heavy gas oil/heavy hydrocarbon molecules are upgraded into lighter fractions such as propylene and LPG by using the FCC process. There is a continuous increase in the demand of lighter fractions due to their wide range of applications. However, conventional FCC catalysts/additives comprising zeolites having small pore sizes are not capable of cracking the bottoms comprising large hydrocarbon molecules.

To overcome the drawbacks of the conventional FCC catalysts/additives, the present disclosure provides an FCC additive composition for bottoms cracking.

The FCC additive composition comprises an acidity enhanced modified clay in an amount in the range of 10 to 30 wt %; an acidity enhanced modified alumina in an amount in the range of 50 to 70 wt %; a binder in an amount in the range of 1 to 30 wt %; a phosphorus oxide in an amount in the range of 5 to 15 wt %; and a boron oxide in an amount in the range of 1 to 10 wt %.

In accordance with the present disclosure, the acidity enhanced modified clay has acidity in the range of 210 to 250 micromole/gm. In accordance with the exemplary embodiment of the present disclosure, the acidity of acidity enhanced modified clay is 229 micromole/gm.

In accordance with the present disclosure, the particle size of the acidity enhanced modified clay is in the range of 1 to 5 microns. In accordance with the exemplary embodiment of the present disclosure, the particle size of the acidity enhanced modified clay is 3 microns.

The clay is selected from the group consisting of kaolin clay, holloysite, and bentonite. In an exemplary embodiment, the clay is kaolin clay.

In accordance with the present disclosure, the acidity enhanced modified alumina has acidity in the range of 370 to 400 micromole/gm. In accordance with the exemplary embodiment of the present disclosure, the acidity enhanced modified alumina has acidity of 378 micromole/gm.

In accordance with the present disclosure, the particle size of the acidity enhanced modified alumina is in the range of 100 to 500 nm. In accordance with the exemplary embodiment of the present disclosure, the particle size of the acidity enhanced modified alumina is 300 nm.

The alumina is selected from the group consisting of colloidal alumina, pseuduoboehmite alumina, bayrite alumina, and gamma alumina. In an exemplary embodiment, the alumina is pseuduoboehmite alumina.

The binder is at least one selected from the group consisting of clay, alumina and silica. In an exemplary embodiment, the binder is silica.

In accordance with the present disclosure, optionally the binder is acidity enhanced binder.

In accordance with an embodiment of the present disclosure, the FCC additive composition comprises an acidity enhanced modified clay in an amount in the range of 15 to 25 wt %; an acidity enhanced modified alumina in an amount in the range of 55 to 65 wt %; a binder in an amount in the range of 5 to 15 wt %; a phosphorus oxide in an amount in the range of 5 to 10 wt %; and a boron oxide in an amount in the range of 2 to 7 wt %.

The FCC additive composition is characterized by having a total surface area in the range of 130 to 150 m$^2$/g, an external surface area in the range of 120 to 140 m$^2$/g, a micro surface area in the range of 10 to 30 m$^2$/g, a pore volume in the range of 0.1 to 1.0 cc and a pore size in the range of 110 to 130 Å.

The FCC additive composition has enhanced pore volume and enhanced pore size, which enables large hydrocarbon molecules (from heavy gas oil) to enter in the pores of the additive composition, which leads to cracking of these molecules to lighter fractions at active centers present inside the pores of the additive composition.

In another aspect, the present disclosure provides a process for preparing an FCC additive composition. The process is described in detail herein below.

Initially, at least one alumina and an aqueous solution of a precursor of phosphorus are mixed in water under stirring for a time period in the range of 0.5 to 5 hours, at a temperature in the range of 25 to 35° C. to obtain a first slurry comprising modified alumina.

The alumina is at least one selected from the group consisting of colloidal alumina, pseuduoboehmite alumina, bayrite alumina, and gamma alumina. In an exemplary embodiment, the alumina is pseuduoboehmite alumina.

The precursor of phosphorus is at least one selected from the group consisting of di-ammonium hydrogen phosphate (DAHP), phosphoric acid, and di-hydrogen ammonium phosphate (DHAP). In an exemplary embodiment, the precursor of phosphorus is phosphoric acid. Typically, the precursor of phosphorus is added in the form of aqueous solution.

A binder is added to the first slurry comprising modified alumina under stirring for a time period in the range of 20 to 60 min, at a temperature in the range of 25 to 35° C. to obtain a second slurry.

The binder is selected from the group consisting of silica, alumina and clay. In accordance with the exemplary embodiment of the present disclosure, the binder is silica.

In accordance with the present disclosure, the binder is optionally treated with an acid selected from the group consisting of hydrochloric acid, nitric acid and acetic acid to obtain the acidity enhanced binder.

Typically, when the binder is silica, the acid treatment of the binder is not required. When the binder is alumina, the acid treatment of the binder is required. The alumina is treated with an acid selected from the group consisting of hydrochloric acid, Formic acid, nitric acid and acetic acid.

A precursor of boron is then added to the second slurry under stirring for a time period in the range of 0.5 to 2 hours, at a temperature in the range of 25 to 35° C. to obtain a resultant slurry comprising acidity enhanced modified alumina. In an exemplary embodiment, the precursor of boron is boric acid. Typically, the precursor is added in the form of aqueous solution.

An acidity enhanced modified clay is added to the resultant slurry under stirring for a time period in the range of 0.5 to 5 hours, at a temperature in the range of 25 to 35° C. to obtain a product mixture comprising the FCC additive composition.

The FCC additive composition is separated from the product mixture. The separated FCC additive composition is dried and calcined to obtain the FCC additive composition.

Typically, the step of drying is carried out at a temperature in the range of 100 to 300° C. In an exemplary embodiment, the FCC additive composition is dried at 150° C.

Typically, the step of calcining is carried out at a temperature in the range of 500 to 600° C. In an exemplary embodiment, the FCC additive composition is calcined at 550° C.

In accordance with the present disclosure, the acidity enhanced modified clay is prepared by treating a clay with an aqueous solution of a mineral acid under stirring at a temperature in the range of 70 to 100° C. for a time period in the range of 40 to 80 min to obtain a mixture.

The clay is selected from the group consisting of kaolin clay, holloysite, and bentonite. In an exemplary embodiment, the clay is kaolin.

The mineral acid is hydrochloric acid. The concentration of the mineral acid is in the range of 0.5 to 5 moles. In accordance with the exemplary embodiment of the present disclosure, the concentration of the mineral acid is 4M.

The so obtained mixture is cooled to a temperature in the range of 20 to 30° C., and filtered to obtain a residue. The residue is washed with water until the washings are acid free to obtain a mesoporous clay.

Water is added to a mesoporous clay, followed by addition of an aqueous solution of a precursor of phosphorus to obtain a slurry.

The slurry is heated at a temperature in the range of 40 to 70° C. for a time period in the range of 0.5 to 5 hours to obtain the acidity enhanced modified clay.

In accordance with the present disclosure, the clay is calcined at a temperature in the range of 700 to 900° C. for a time period in the range of 5 to 15 hours prior to treating that with the mineral acid.

The FCC additive composition of the present disclosure is optimized by calcining the clay with the aim of obtaining the meta-clay having increased pore size. Further, the acidity of clay is enhanced by treating it with mineral acid, followed by the treatment with a phosphoric acid. Typically, the acidity of the clay, prior to acid treatment, is in the range of 30 to 40 micromole/gm. The acid treatment of the clay increases the acidity of the clay in the range of 210 to 250 micromole/gm, which facilitates cracking of the hydrocarbons.

Similarly, the acidity of alumina is also enhanced by treating it with the phosphoric acid, followed by treatment with a boric acid. Typically, the acidity of the alumina, prior to acid treatment, is in the range of 300 to 320 micromole/gm. The acid treatment of the alumina increases the acidity of the alumina in the range of 370 to 400 micromole/gm, which facilitates cracking of the hydrocarbons.

The acidity enhanced mesoporous clay along with the acidity enhanced alumina is capable of effectively cracking the bottoms (heavy gas oil) to lighter fractions, due to the enhanced acidity, the enhanced pore size and the enhanced pore volume, with reduced formation of dry gas.

In an embodiment of the present disclosure, the FCC additive composition of the present disclosure is used in combination with the FCC catalyst, for cracking bottoms to produce lighter fractions.

The hydrocarbon feed is selected from gas oil, vacuum gas oil, oil residue, slurry oil, heavy crude.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1: Preparation of the Modified Clay in Accordance with the Present Disclosure Initially, Kaolin (50 g) was calcined at 800° C. for 10 hours, wherein the temperature is increased at a rate of 10° C./min to obtain meta-kaolin (43.6 g).

In the next step, 4M HCl solution (1.08 L, 30 wt %) was added to the meta-kaolin (36 gm) and stirred at 90° C. for 2 hours to obtain a mixture. The mixture was cooled, and filtered to obtain a residue. The residue was washed with water until chloride concentration of washings reaches less than 50 ppm to obtain a mesoporous meta-clay (22.0 g).

Water (30 mL) was added to the mesoporous meta-clay (1 gm), followed by addition of a phosphoric acid (1 mL, 85%) to obtain a resultant mixture. The resultant mixture was then stirred at 30° C. for 2 hours to obtain the modified clay.

The acidity of the modified clay was 229 micromoles/gm and the particle size is 3 microns.

Experiment 2: Preparation of the FCC Additive Composition in Accordance with the Present Disclosure Water (75 mL) was added to the Pesudoboehmite alumina (18 gm, LOI—27.5% at 550° C.), followed by addition of phosphoric acid (1.6 mL, 85% concentration) and the mixture was stirred for 2 hours at 30° C. to obtain first slurry containing the modified alumina.

Ludox HS-40 (binder, 5 gm) was added to the first slurry containing the modified alumina and stirred for 30 minutes to obtain a second slurry.

Boric acid (5.8 gm dissolved in 20 mL of hot water) was added to the second slurry under stirring for 1 hour to obtain a resultant slurry. The acidity of the modified alumina was 378 micromole/gm.

The modified clay obtained in experiment 1 was added to the resultant slurry and at 30° C. stirred for 2 hours to obtain a product mixture comprising FCC additive composition.

The FCC additive composition was separated from the product mixture and washed with water. The washed FCC additive composition was dried at 150° C. and then calcined at 550° C. for 4 hours to obtain the FCC additive composition.

Comparative Experiment 3: Preparation of the FCC Additive Composition

Same experimental procedure as disclosed in experiment 2 was followed, except the addition of boric acid.

The FCC additive composition obtained in experiments 2 and 3 is given below in Table 1.

TABLE 1

The composition of the FCC additive composition

| Sr. No. | Component | FCC additive composition of the present disclosure (wt %) | FCC additive composition without boron oxide (wt %) |
|---|---|---|---|
| 1. | Acidity enhanced mesoporous clay (AEMC) | 20% | 18% |
| 2. | Acidity enhanced alumina (AEA) | 58% | 65% |
| 3. | Binder | 10% | 10% |
| 4. | P$_2$O$_5$ | 7% | 7% |
| 5. | B$_2$O$_3$ | 5% | — |

The characterization of the FCC additives composition of the present disclosure, FCC additive composition without boron oxide and the conventional FCC additives having zeolite component is summarized in Table 2.

TABLE 2

Characterization of a reference FCC additive and FCC additive composition of the present disclosure

| Sr. No. | Properties | FCC additive composition with boron oxide | FCC additive composition without boron oxide | Reference FCC additive (E cat) |
|---|---|---|---|---|
| 1. | Total Surface area | 145 m$^2$/g | 158 m$^2$/g | 148 m$^2$/g |
| 2. | External Surface area | 127 m$^2$/g | 139 m$^2$/g | 140 m$^2$/g |
| 3. | Micro surface area | 17.9 m$^2$/g | 19 m$^2$/g | 8 m2/g |
| 4. | Pore volume | 0.4 cc | 0.41 cc | 0.38 cc |
| 5. | Pore size | 120 Å | 118 Å | 100 Å |
| 6. | Acidity- (NH$_3$ uptake) | 430 micromol/g | 424 micromol/g | 389 micromol/g |

From Table 1, it is evident that the FCC additive composition of the present disclosure has enhanced pore size, which enables cracking of the large size hydrocarbon molecules present in the bottoms.

Experiment 4: Performance Assessment of the FCC Additive Composition of the Present Disclosure The FCC additives obtained in Experiments 2 and 3 were used for catalytic cracking of bottoms.

TABLE 3

Results for cracking of bottoms

| Catalyst Name | E-CAT reference | E-cat + 10% FCC additive composition without boron oxide | E-cat + 10% FCC additive composition of the present disclosure with Boron oxide |
|---|---|---|---|
| Reaction parameters | | | |
| Reactor Temp (° C.) | 529 | 529 | 529 |
| Catalyst/Oil | 4.0 | 4.0 | 4.00 |
| Conversion (wt %) | 66.74 | 67.07 | 67.55 |
| Yields (wt %) | | | |
| Coke Yield (wt %) | 5.87 | 5.89 | 5.92 |
| Dry Gas(wt %) | 4.13 | 3.88 | 3.99 |
| LPG(wt %) | 15.69 | 16.22 | 16.69 |
| Gasoline (wt %) | 41.05 | 41.08 | 40.95 |
| LCO (wt %) | 19.01 | 19.30 | 19.05 |
| Bottoms (wt %) | 14.25 | 13.63 | 12.85 |

From Table 3, it is evident that the FCC additive composition of the present disclosure is capable of effectively, cracking the bottoms (67.55%) having larger molecules as compared to the conventional FCC additive (66.74%) and FCC additive without boron oxide (67.07%). Further, formation of dry gas is also reduced by using the FCC additive composition of the present disclosure as compared to the E-cat. The formation of dry gas by using the FCC additive composition of the present disclosure is slightly higher as compared to the FCC additive without boron oxide, due to the higher conversion of the bottoms.

TECHNICAL ADVANCEMENTS AND ECONOMICAL SIGNIFICANCE

The present disclosure described herein above has several technical advantages including, but not limited to, the realization of an FCC additive composition, which:

has enhanced pore size and pore volume;
is capable of reducing bottoms comprising large hydrocarbon molecules; and
reduces formation of dry gas.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing a fluid catalytic cracking (FCC) additive composition, the process consisting of:
   a. mixing in water, at least one alumina and an aqueous solution of a precursor of phosphorus under stirring for a time period in a range of 0.5 to 5 hours, at a temperature in a range of 25 to 35° C. to obtain a first slurry comprising a modified alumina;
   b. adding at least one binder to the first slurry under stirring for a time period in a range of 20 to 60 minutes, at a temperature in a range of 25 to 35° C. to obtain a second slurry;
   c. adding a precursor of boron to the second slurry under stirring for a time period in a range of 0.5 to 2 hours, at a temperature in a range of 25 to 35° C. to obtain a resultant slurry;
   d. adding an acidity enhanced modified clay to the resultant slurry under stirring for a time period in a range of 0.5 to 5 hours, at a temperature in a range of 25 to 35° C. to obtain a product mixture comprising the FCC additive composition; and
   e. separating the FCC additive composition from the product mixture, followed by drying and calcining to obtain the FCC additive composition.

2. The process as claimed in claim 1, wherein the at least one alumina is selected from the group consisting of colloidal alumina, pseudoboehmite alumina, bayerite alumina, and gamma alumina.

3. The process as claimed in claim 1, wherein the alumina is pseudoboehmite alumina.

4. The process as claimed in claim 1, wherein the at least one binder is selected from the group consisting of silica, alumina, and clay.

5. The process as claimed in claim 1, wherein the at least one binder is silica.

6. The process as claimed in claim 1, wherein the precursor of phosphorus is at least one selected from the group consisting of di-ammonium hydrogen phosphate (DAHP), phosphoric acid, and di-hydrogen ammonium phosphate (DHAP).

7. The process as claimed in claim 1, wherein the precursor of phosphorus is phosphoric acid.

8. The process as claimed in claim 1, wherein the precursor of boron is boric acid.

9. The process as claimed in claim 1, wherein the drying is carried out at a temperature in a range of 100 to 300° C.

10. The process as claimed in claim 1, wherein the calcining is carried out at a temperature in a range of 500 to 600° C.

11. The process as claimed in claim 1, wherein the acidity enhanced modified clay is prepared by:
   i. treating a clay with an aqueous solution of a mineral acid with a concentration of 0.5 to 5 M under stirring at a temperature in a range of 70 to 100° C. for a time period in a range of 40 to 80 minutes to obtain a mixture;
   ii. cooling the mixture to a temperature in a range of 20 to 30° C., followed by filtering the mixture to obtain a residue;
   iii. washing the residue with water until the residue is acid free to obtain a mesoporous clay;
   iv. adding water and an aqueous solution of a precursor of phosphorus to the mesoporous clay to obtain a slurry; and
   v. heating the slurry at a temperature in a range of 40 to 70° C. for a time period in a range of 0.5 to 5 hours to obtain the acidity enhanced modified clay.

12. The process as claimed in claim 11, wherein the clay is calcined at a temperature in a range of 700 to 900° C. for a time period in a range of 5 to 15 hours, prior to the treatment with the mineral acid of step (i).

13. The process as claimed in claim 11, wherein the clay is selected from the group consisting of kaolin clay, holloysite, and bentonite.

14. The process as claimed in claim 11, wherein the clay is kaolin.

15. The process as claimed in claim 11, wherein the mineral acid is hydrochloric acid.

* * * * *